(12) United States Patent
Bulut et al.

(10) Patent No.: US 12,524,678 B2
(45) Date of Patent: Jan. 13, 2026

(54) FINDING SEMANTICALLY RELATED SECURITY INFORMATION

(71) Applicant: MICROSOFT TECHNOLOGY LICENSING, LLC, Redmond, WA (US)

(72) Inventors: Muhammed Fatih Bulut, Cambridge, MA (US); Lloyd Geoffrey Greenwald, Murray Hill, NJ (US); Aditi Kamlesh Shah, Redmond, WA (US); Leo Moreno Betthauser, Redmond, WA (US); Yingqi Liu, San Jose, CA (US); Ning Xia, Redmond, WA (US); Siyue Wang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 161 days.

(21) Appl. No.: 18/335,064

(22) Filed: Jun. 14, 2023

(65) Prior Publication Data

US 2024/0330446 A1    Oct. 3, 2024

Related U.S. Application Data

(60) Provisional application No. 63/454,949, filed on Mar. 27, 2023.

(51) Int. Cl.
*G06N 3/0895* (2023.01)
*G06F 21/55* (2013.01)
*G06N 3/045* (2023.01)

(52) U.S. Cl.
CPC ......... *G06N 3/0895* (2023.01); *G06F 21/554* (2013.01); *G06F 2221/034* (2013.01); *G06N 3/045* (2023.01)

(58) Field of Classification Search
CPC ... G06F 221/034; G06F 21/554; G06N 3/045; G06N 3/0895
See application file for complete search history.

(56) References Cited

U.S. PATENT DOCUMENTS 11,444,978 B1    9/2022  Liao
12,267,345 B1    4/2025  Erlingsson
(Continued)

OTHER PUBLICATIONS

International Search Report and Written Opinion received for PCT Application No. PCT/US2024/019616, Jul. 11, 2024, 15 pages.
(Continued)

*Primary Examiner* — Etienne P Leroux
(74) *Attorney, Agent, or Firm* — Tyler Thorp; Newport IP, LLC

(57) ABSTRACT

Methods and apparatuses for improving the performance and energy efficiency of machine learning systems that generate security specific machine learning models and generate security related information using security specific machine learning models are described. A security specific machine learning model may comprise a security specific large language model (LLM). The security specific LLM may be trained and deployed to generate semantically related security information. The security specific LLM may be pretrained with a security specific data set that was generated using similarity deduplication and long line handling, and with security specific objectives, such as next log line prediction based on host, system, application, and cyber attacker behavior. The security specific large language model may be fine-tuned using a security specific similarity dataset that may be generated to align the security specific LLM to capture similarity between different security events.

20 Claims, 10 Drawing Sheets

(56) References Cited

U.S. PATENT DOCUMENTS

| | | | |
|---|---|---|---|
| 2018/0248902 | A1 | 8/2018 | Dănilă-Dumitrescu et al. |
| 2022/0279014 | A1 | 9/2022 | Stokes, III et al. |
| 2022/0318255 | A1 | 10/2022 | Fei |
| 2023/0076127 | A1 | 3/2023 | Yu |
| 2024/0404243 | A1 | 12/2024 | Zhao |
| 2024/0406166 | A1 | 12/2024 | Bell |
| 2024/0414048 | A1 | 12/2024 | Kasap |
| 2024/0414211 | A1 | 12/2024 | Boyer |
| 2024/0427879 | A1 | 12/2024 | Bulut |
| 2025/0111238 | A1* | 4/2025 | Islam .................... G06N 20/00 |

OTHER PUBLICATIONS

International Search Report and Written Opinion received for PCT Application No. PCT/US2024/034647, Dec. 13, 2024, 21 pages.

"Large language model", Retrieved from the URL: https://en.wikipedia.org/w/index.php?title=Largelanguage_model&oldid=1161462207, Jun. 22, 2023, 18 Pages.

"Parsing", Retrieved from the URL: https://en.wikipedia.org/w/index.php?title=Parsing&oldid=1153935128, May 9, 2023, 12 Pages.

Invitation to pay additional fees received for PCT Application No. PCT/US2024/034647, Oct. 22, 2024, 10 pages.

Tunstall, et al., "Natural Language Processing with Transformers, Revised Edition", Published in O'Reilly Media Incorporation, May 2022, 409 Pages.

Vaswani, et al., "Attention Is All You Need", In Proceedings of 31st Conference on Neural Information Processing Systems, Dec. 4, 2017, 11 Pages.

Adam, et al., "Attack Techniques and Threat identification for Vulnerabilities," In repository of arXiv:2206.11171v1, Jun. 22, 2022, pp. 1-9.

Non-Final Office Action mailed on Jun. 13, 2025, in U.S. Appl. No. 18/340,708, 20 pages.

Notice of allowance mailed on Oct. 10, 2025, in U.S. Appl. No. 18/340,708, 09 pages.

International Preliminary Report on Patentability (Chapter I) received for PCT Application No. PCT/US2024/019616, Oct. 9, 2025, 10 pages.

* cited by examiner

Tokenizer Examples

```
Log Line
---
sudo: root : TTY=unknown ; PWD=/ ; USER=root ; COMMAND=/bin/ip
netns identify 4867
```

BERT Tokenizer: ['su', '##do', ':', 'root', ':', 'T', '##TY', '=', 'unknown', ';', 'P', '##WD', '=', '/', ';', 'US', '##ER', '=', 'root', ';', 'CO', '##MM', '##AN', '##D', '=', '/', 'bin', '/', 'i', '##p', 'net', '##ns', 'identify', '48', '##6', '##7']

GPT3 Tokenizer: ['sudo', ':', root, :, T, TY, =, unknown, ;, P, WD, =/, ;, US, ER, =, root, :, COMM, AND, =/, bin, /, ip, net, ns, identify, 48, 67']

Security Tokenizer: ['sudo', ':', 'root', ':', 'TTY', '=', 'unknown', ';', 'PWD', '=', '/', ';', 'USER', '=', 'root', ';', 'COMMAND', '=', '/', 'bin', '/', 'ip', 'netns', 'identify', '4867']

Natural Language Tokenizers

170

Security Specific Tokenizers

FIG. 1B

Example log parser generated templates

- Log 1: "<4>Nov 30 23:58:59 ZRH21-0101-0701-03T0 kernel: [23036167.468665] sx_netdev_handle_pude_event: Called for logical port - 12F00 status DOWN"
- Template 1: <4>Nov 30 <*> <*> kernel: <*> sx_netdev_handle_pude_event: Called for logical port - <*> status <*>

- Log 2: 34.66.134.112 - - [25/Jan/2019:14:11:59 +0330] "GET /filter/1724|1400,1725|1.2,b165,b3,b48,p4403 HTTP/1.1" 200 28691 "-" "Mozilla/5.0 (compatible; AhrefsBot/6.1; +http://domain.com/robotics/)" "-"
- Template 2: "<*> - - <*> +0330] "" "GET <*> <*> <*> <*> <*> <*> <*> <*> HTTP/1.1" <*> <*> "" "-" "" "Mozilla/5.0 (compatible <*> <*>) "" "-" """

FIG. 1C

FINDING SEMANTICALLY RELATED SECURITY INFORMATION

CLAIM OF PRIORITY

This application claims the benefit of and priority to U.S. Provisional Application No. 63/454,949, filed Mar. 27, 2023, which is herein incorporated by reference in its entirety.

BACKGROUND

A networked computing environment may provide secure access to protected resources (e.g., networks, servers, storage devices, files, and computing applications) based on access rights that are tailored to particular users of the networked computing environment. An access control system may perform various functions for managing access to the protected resources including authentication, authorization, and auditing. Authentication may refer to the process of verifying that credentials provided by a user are valid or to the process of confirming the identity associated with the user (e.g., confirming that a correct password has been entered for a given username). Authorization may refer to the granting of a right or permission to access a protected resource or to the process of determining whether an authenticated user is authorized to access a protected resource. Auditing may refer to the process of storing records (e.g., event logs) for preserving evidence related to access control events. Event logs may record various types of security related information, such as information associated with login sessions, file deletions, failed password attempts, and account lockouts.

BRIEF SUMMARY

Systems and methods for improving the performance and energy efficiency of machine learning systems that generate security specific machine learning models, generate security related information using the security specific machine learning models, and/or detect security related anomalies are provided. One example of a security specific machine learning model is a security specific large language model. A security specific large language model may be trained and deployed to generate and output semantically related security information. For example, the security specific large language model may be used to determine whether a particular security log that stores log lines regarding security events (e.g., failed logins, password changes, failed authentication requests, and file deletions) for a networked computing environment includes a log line associated with a malicious security event. The security specific large language model may be pretrained with a security specific dataset that was generated using similarity deduplication and long line handling, and with security specific objectives, such as next log line prediction based on host, system, application, and cyber attackers' behavior. Further, a security specific similarity dataset may be generated to align the security specific large language model to capture similarity between different security events. The security specific large language model may be fine-tuned using the security specific similarity dataset and then stored within a datastore.

According to some embodiments, the technical benefits of the systems and methods disclosed herein include reduced energy consumption, reduced cost of computing and storage resources, improved network and data security, and improved system performance. Other technical benefits can also be realized through implementations of the disclosed technologies.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Like-numbered elements may refer to common components in the different figures.

FIG. 1B depicts one embodiment of a security specific tokenizer that provides improved tokenization of security log files compared with natural language tokenizers.

FIG. 1C depicts examples of templates generated using a log parser for various lines in a security log file.

DETAILED DESCRIPTION

Figure 1A:
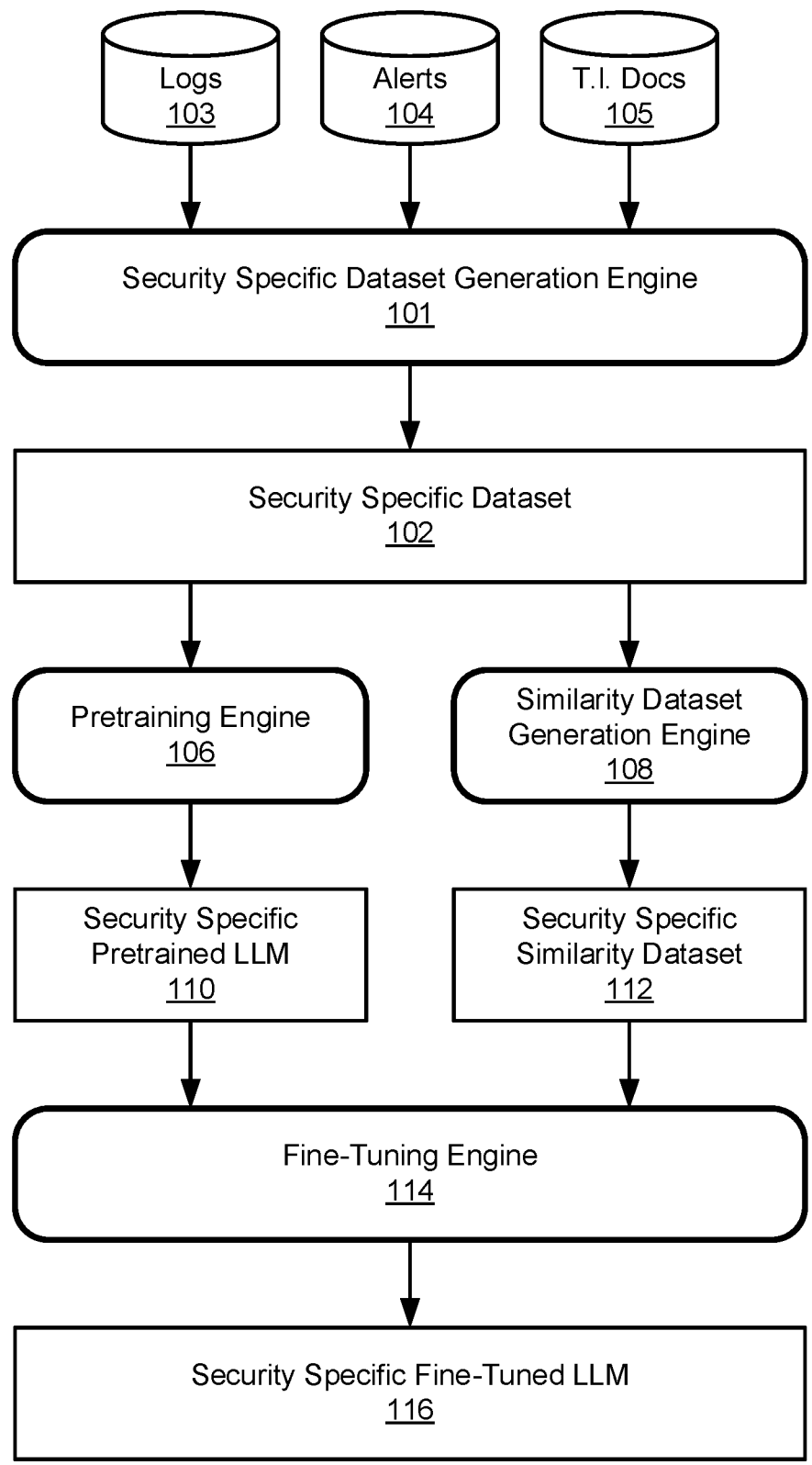
FIG. 1A depicts one embodiment of software-level components for generating a security specific LLM.

The technologies described herein utilize security specific large language models (LLMs) to improve the performance and energy efficiency of machine learning systems that generate security related information and detect security related anomalies and events (e.g., detecting that a file has been deleted by a threat actor or that an incorrect password has been submitted more than a threshold number of times to access an account). In some embodiments, a security specific LLM may be pretrained, fine-tuned, and deployed to generate and output semantically related security information. The security specific LLM may be pretrained using a security specific dataset that incorporates long line handling and similarity deduplication (e.g., removing log files or lines from the security specific dataset based on cosine similarity between other log files or lines within the security specific dataset). The security specific LLM may be pretrained with security specific objectives, such as next log line prediction based on host, system, application, and cyber attackers' behavior, in addition to masked token prediction. Further, a security specific similarity dataset may be generated to align the security specific LLM to capture similarity between different cyber security events such as failed logins, password changes, failed authentication requests, and file deletions. The security specific LLM may be fine-tuned using the security specific similarity dataset and then stored within a datastore or persistent storage. The fine-tuned version of the security specific LLM may be deployed to generate security related information that may be used to enable scenarios such as search and retrieval of event log lines, clustering of similar security events into buckets, and prompt generation for generative AI models.

A technical issue with utilizing a generic LLM that was trained with corpus data comprising natural language text data (e.g., from websites) for identifying semantically related security information is that the language used within cybersecurity logs, alerts, and threat intelligence documents is different from natural language. For example, in natural language the building blocks of language include "words", "idioms" and "sentences", whereas in cybersecurity, the building blocks may include "log entries", "alerts" and "threat intelligence" data. One technical benefit of training a security specific LLM with security specific objectives and security specific datasets is that the semantic meaning of tokens in security logs, alerts, and threat intelligence documents may be more accurately captured by the security specific LLM, which may improve the performance of the security specific LLM when generating completions that provide security related information for anomaly detection, search, and other security related applications.

In some embodiments, a security specific dataset may be generated from a set of security documents, such as security logs, alerts, and threat intelligence documents. The set of security documents may comprise electronic documents that store structured data and/or unstructured data related to security events. A security log may include records of security events, such as login/logout activity, including associated time stamps, locations, usernames, IP addresses, and computer names for each security event. As examples, a security log may include log lines that record security policy violations, file deletions, successful and unsuccessful login attempts, authentication successes and failures, changes in user privileges, and software installations and deletions. The security alerts may include records of system and application errors and alerts. The threat intelligence documents may include records of threat intelligence feeds.

Log lines within the security specific dataset that are redundant (e.g., two log lines that are exact matches with each other) or that have a degree of similarity (e.g., have a cosine similarity score above 0.5 or other threshold value) may be removed from the security specific dataset prior to pretraining the security specific LLM. In one example, log lines that are longer than a threshold length (e.g., longer than 512 tokens or 1024 character strings) may be divided into multiple lines with each line less than the threshold length. In another example, a log line that is longer than a threshold number of tokens may be partitioned into equal-sized lines with lengths less than the threshold number of tokens. In another example, a moving window approach with overlaps may be used in which a log line of 1024 tokens is partitioned into three lines of length 512 tokens; a first line may comprise the first 512 tokens of the log line, a second line may comprise the tokens between the $256^{th}$ token and the $768^{th}$ token of the log line, and a third line may comprise the last 512 tokens of the log line. In this case, the window size may comprise 512 tokens. The three lines may replace the original log line of 1024 tokens within a security document that included the log line. Technical benefits of adjusting a window size applied to log lines within security logs during generation of a security specific dataset for training a security specific LLM include reduced energy consumption and reduced cost of computing and storage resources during generation of the security specific LLM.

In some embodiments, each log line in a security log may be mapped to a particular event ID associated with a type of security event (e.g., a login activity to a particular machine). The particular event ID may be used to map each log line to a particular type of security event. In some cases, the window size for partitioning log lines that are longer than a threshold number of tokens (e.g., log lines that are more than 1024 tokens) or that are longer than a threshold number of character sequences may be adjusted based on the particular event ID for a log line. In one example, the window size may be set to 1024 tokens if the particular event ID for a log line corresponds with a login/logout activity and may be set to 512 tokens if the log line corresponds with an authentication failure.

The security specific dataset may be used to pretrain a security specific LLM with security specific objectives, such as next log line prediction given a particular host, system, application, or type of cyber attacker. A cyber attack may comprise a set of actions performed by a threat actor to gain unauthorized access to computing resources. Some examples of types of cyber attacks include phishing attacks, denial-of-service attacks, brute-force attacks, and malware attacks.

Subsequently, the security specific LLM may be fine-tuned using a security specific similarity dataset. The security specific similarity dataset may include positive log line pairs and negative log line pairs. In some cases, each log line may be assigned an event ID and two log lines with the same event ID may be grouped together as a positive pair. In cases where an event ID cannot be extracted from a log line, then a template parser may be used to identify an event ID for each log line.

In one embodiment, a security specific LLM may be deployed to generate search results for a knowledge base of security logs. The security specific LLM may be used to create embedding representations for each of the documents in the knowledge base. Given a query from a search user for security related information from the security logs, the query may be converted into an embedding using the security specific LLM and then compared with the embedding representations for each of the documents in the knowledge base to identify and rank a set of relevant documents.

FIG. 1A depicts one embodiment of software-level components for generating a security specific LLM. The software-level components include a security specific dataset generation engine 101, pretraining engine 106, similarity dataset generation engine 108, and fine-tuning engine 114. The software-level components may be implemented or executed using a security system, such as the data security system 120 in FIG. 2C. A set of security documents including security logs 103, alerts 104, and threat intelligence (T.I.) documents 105 may be used by the security specific dataset generation engine 101 to generate a security specific dataset 102. The security specific dataset 102 may include data related to security logs, alerts, events, incidents, threat intelligence information and other security related data. The security specific dataset 102 may be stored in a datastore or a data storage layer.

In some cases, security related data within the set of security documents may involve lots of repetition (e.g., numerous similar login activity for a particular user), which may be detrimental for learning. Therefore, in some cases, a reduction or elimination of some of the duplicate information or duplicate log lines may be performed based on one or more combinations of exact matches and fuzzy matches.

In one embodiment, the security specific dataset generation engine 101 may remove documents and portions of documents (e.g., single lines, multiple lines, or paragraphs) from the set of security documents to reduce duplication of content. In one example, the security specific dataset generation engine 101 may remove log lines within the security specific dataset 102 that are redundant (e.g., log lines that are exact matches with each other) or that have a degree of similarity (e.g., have a cosine similarity score above 0.5) may be removed from the security specific dataset 102. Cosine similarity may comprise one metric for determining how similar two documents or two log lines are to each other. The specific dataset generation engine 101 may also eliminate long lines by segmenting lines with lengths longer than a threshold length (e.g., that are longer than a threshold number tokens or longer than a threshold number of character strings) into two or more lines, such that each line is less than the threshold length.

In some cases, a moving window approach with overlaps may be used in which a log line is partitioned into multiple lines of a fixed length (e.g., a fixed length of 512 tokens) and in which consecutive lines are offset by an amount less than the fixed length (e.g., offset by 256 tokens). In one example, a log line comprising 1024 tokens that exceeds a threshold number of tokens may be partitioned into a first line with the first 512 tokens of the log line, a second line offset by 256 tokens that includes the $257^{th}$ token through $768^{th}$ token of the log line, and a third line with the last 512 tokens of the log line. A tokenizer may be used to split a given raw input text into tokens by considering security specific details such as time variance.

FIG. 1B depicts one embodiment of a security specific tokenizer that provides improved tokenization of security log files compared with natural language tokenizers. Tokenization may be used to convert text or a sequence of characters into a sequence of tokens. For example, log lines comprising text may be split into tokens, which may comprise words, subwords (or character n-gram), characters, and punctuation symbols.

As security related data in a set of security documents may involve long text portions, the long text portions may be divided into multiple smaller text portions using a combination of different approaches including moving window, paragraph split or random split. Artificial intelligence may also be used to learn which parts of the text within the set of security documents are more important to use, and which can be improved with user feedback.

The pretraining engine 106 may generate the security specific pretrained LLM 110 using the security specific dataset 102 with security specific objectives, such as next log line prediction given log lines associated with a host, system, application, users, and/or a history of cyber attack behavior. In one example, a next log line may be predicted given an input sequence of log lines associated with a particular user attempting to access a computer system and/or a number of unsuccessful login attempts by the particular user. The security specific pretrained LLM 110 may be stored in a data storage layer or a persistence layer.

An encoder style transformer architecture (e.g., an encoder only transformer architecture) may be utilized to pretrain an LLM that learns the nuances among different tokens using self-supervised learning. This pretraining can include tasks such as predicting the next security event or predicting the next log line. The definition of a next security event can be scoped to different entities including but not limited to users, hosts, applications or attackers' behaviors.

The similarity dataset generation engine 108 may generate a security specific similarity dataset 112 that includes positive pairs and negative pairs for facilitating contrastive learning. During fine-tuning of the security specific pretrained LLM 110, the fine-tuning engine 114 may use the positive pairs and negative pairs to generate an embedding space in which positive pairs are given similar embeddings that minimize embedding distance while negative pairs are pushed apart and are given different embeddings that maximize embedding distance.

The security specific similarity dataset 112 may be generated by the similarity dataset generation engine 108 to enable fine-tuning of the security specific pretrained LLM 110 to create improved representations (or embeddings) of security related data. In some cases, event identifiers (or event IDs) may be used to determine log line pairs. For example, with security logs, a log line pair may be determined by grouping similar log lines together if both log lines are determined to map to the same event ID or to the same type of security event. In some cases, an event ID may be parsed directly from a log line (e.g., the event ID may be embedded within the log line). In cases in which event IDs cannot be directly parsed from one or more log lines, then a generic parser may be used to create unique templates for the one or more log lines, and then each unique template may correspond with a unique event ID. A positive pair of log lines may be identified if both log lines map to the same unique event ID. A negative pair of log lines may be identified if both log lines do not map to the same unique event ID.

FIG. 1C depicts examples of templates generated using a log parser for various lines in a security log file. The templates may be extracted by identifying commonly repeated words or phrases occurring within log lines of the security log file. In one example, a first template 172 includes a common date of "Nov30" and a common event "Called for logical port." The first template 172 may be used to identify log lines in the security log file and other security log files that match the first template. Each log line that matches the first template 172 may be deemed to belong to a first unique event ID associated with the first template 172. The second template 174 includes a common command "GET" and a common phrase "Mozilla/5.0 (compatible." The second template 174 may be used to identify log lines in the security log file and other security log files that match the second template. Each log line that matches the second template 174 may be deemed to belong to a second unique event ID associated with the second template 174.

In some embodiments, positive pairs and the negative pairs may be used to generate the security specific fine-tuned LLM 116 by fine-tuning the security specific pretrained LLM 110 such that positive pairings of similar cyber security events (e.g., failed logins and password changes) map to embeddings that are close to each other within some distance measure (e.g., within a threshold cosine similarity or Euclidian distance) and negative pairings map to embeddings that are far apart by more than the distance measure. The security specific fine-tuned LLM 116 may be stored in a data storage layer or a persistence layer.

Figure 1D:
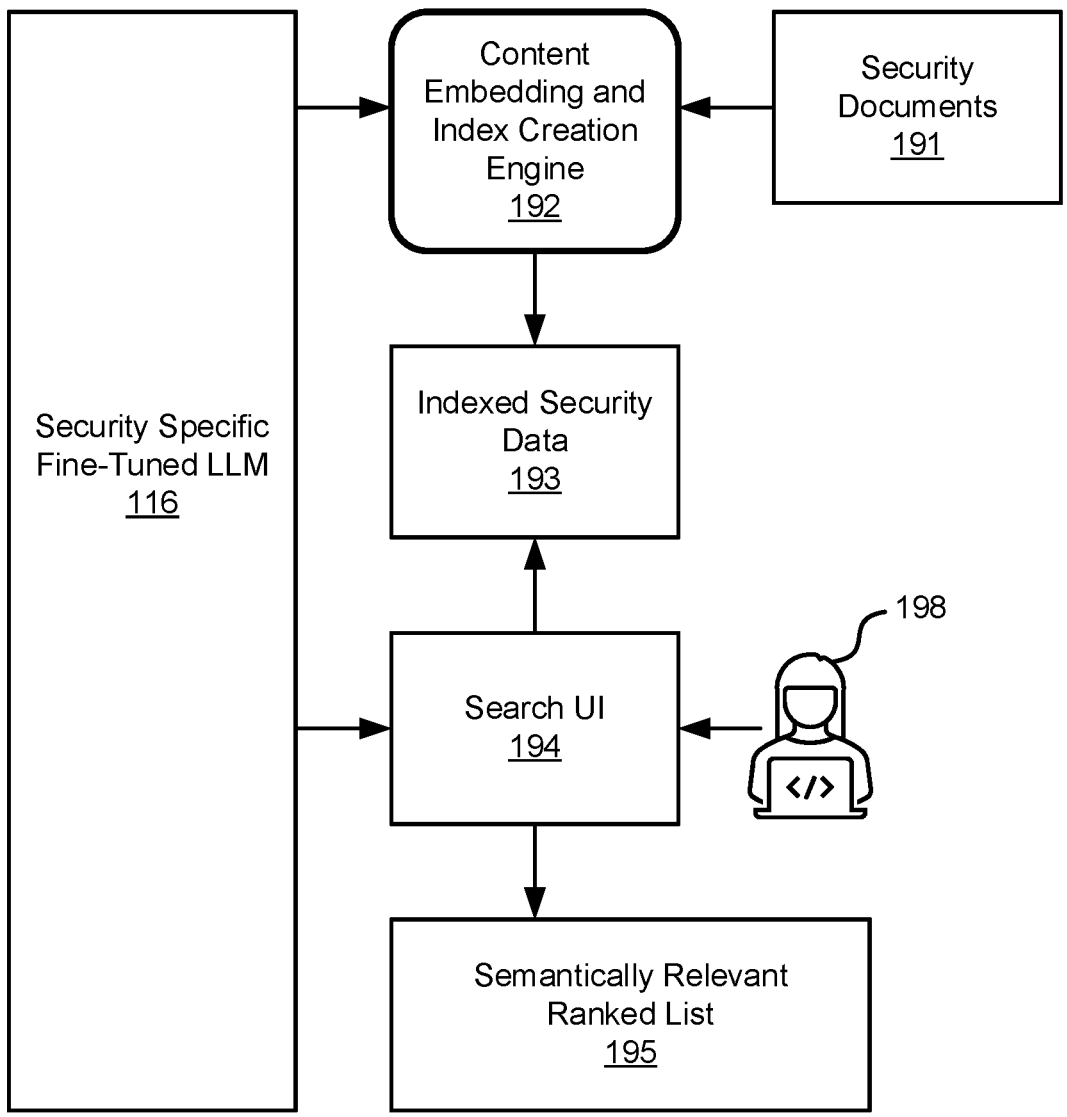
FIG. 1D depicts one embodiment of software-level components for deploying a security specific LLM.

FIG. 1D depicts one embodiment of software-level components for deploying a security specific LLM, such as the security specific fine-tuned LLM 116, to provide indexing and searching of security related content that is stored within a set of security documents. As depicted, the security specific fine-tuned LLM 116 may be used by the content embedding and index creation engine 192 to generate indexed security data 193 for the security documents 191. The security documents 191 may include security logs, such as logs 103 in FIG. 1A, and security alerts, such as alerts 104 in FIG. 1A. An end user 198 of a search user interface (UI) 194 may enter a search query for security related information within the security documents 191 and in response the search UI 194 may output a semantically relevant ranked list 195 of relevant content from the security documents 191. The search UI 194 may display a ranked list of pointers to the relevant content.

Figure 2A:
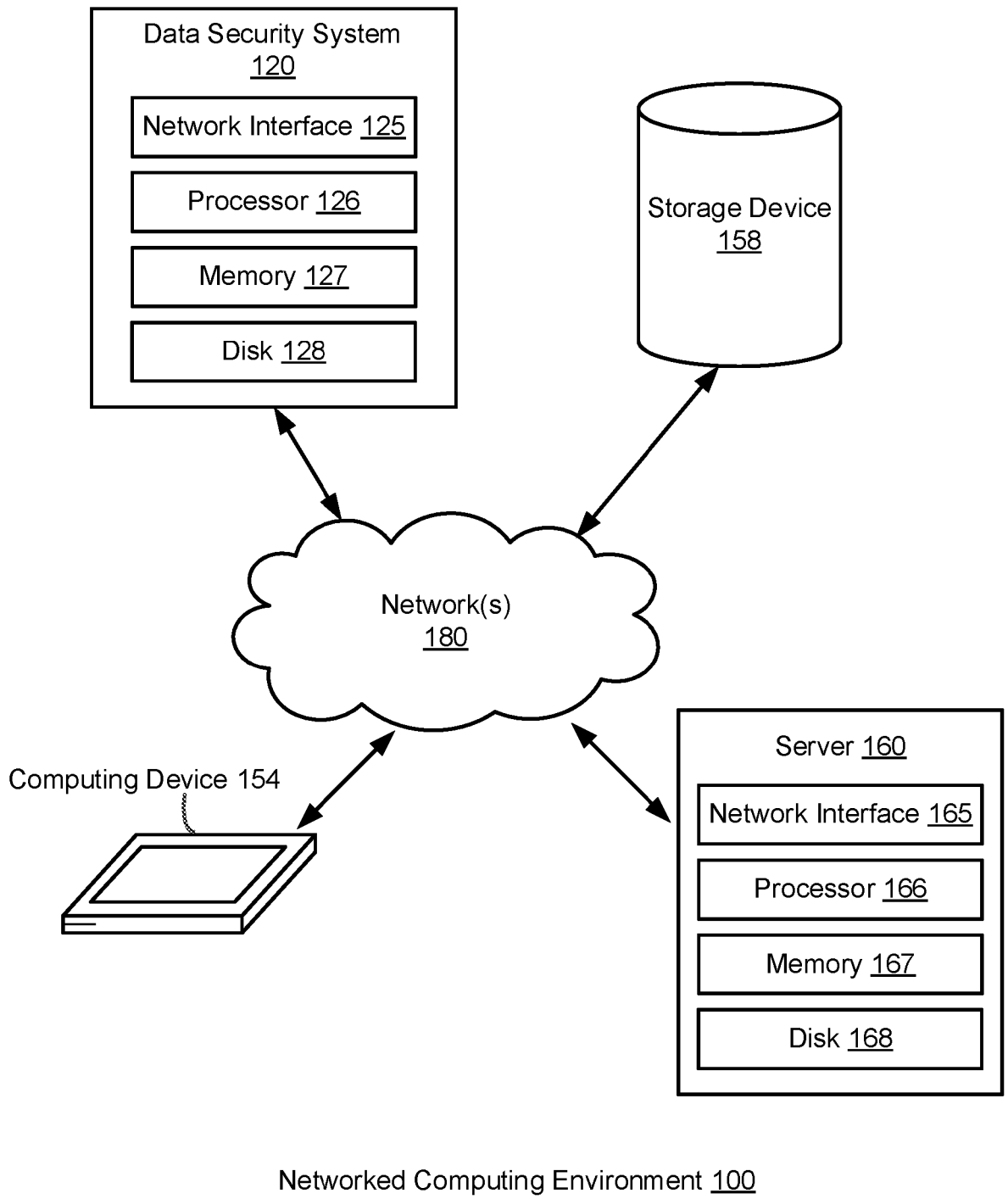
FIG. 2A depicts one embodiment of a networked computing environment in which the disclosed technology may be practiced.

FIG. 2A depicts one embodiment of a networked computing environment 100 in which the disclosed technology may be practiced. The networked computing environment 100 includes a data security system 120, storage device 158, server 160, and a computing device 154 in communication with each other via one or more networks 180. The networked computing environment 100 may include various computing and storage devices interconnected through one or more networks 180. The networked computing environment 100 may correspond with or provide access to a cloud computing environment providing Software-as-a-Service (SaaS) or Infrastructure-as-a-Service (IaaS) services. The one or more networks 180 may allow computing devices and/or storage devices to connect to and communicate with other computing devices and/or other storage devices. In some cases, the networked computing environment 100 may include other computing devices and/or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, a data storage system, or a cloud-based data storage system. The one or more networks 180 may include a cellular network, a mobile network, a wireless network, a wired network, a secure network such as an enterprise private network, an unsecure network such as a wireless open network, a local area network (LAN), a wide area network (WAN), the Internet, or a combination of networks.

In some embodiments, the computing devices within the networked computing environment 100 may comprise real hardware computing devices or virtual computing devices, such as one or more virtual machines. The storage devices within the networked computing environment 100 may comprise real hardware storage devices or virtual storage devices, such as one or more virtual disks. The real hardware storage devices may include non-volatile and volatile storage devices.

The data security system 120 may comprise a computing system or environment for generating security specific LLMs and detecting security related anomalies using the security specific LLMs. As depicted in FIG. 2A, the data security system 120 includes a network interface 125, processor 126, memory 127, and disk 128 all in communication with each other. The network interface 125, processor 126, memory 127, and disk 128 may comprise real components or virtualized components. In one example, the network interface 125, processor 126, memory 127, and disk 128 may be provided by a virtualized infrastructure or a cloud-based infrastructure. Network interface 125 allows the database system 120 to connect to one or more networks 180. Network interface 125 may include a wireless network interface and/or a wired network interface. Processor 126 allows the database system 120 to execute computer readable instructions stored in memory 127 in order to perform processes described herein. Processor 126 may include one or more processing units, such as one or more CPUs, one or more GPUs, and/or one or more NPUs. Memory 127 may comprise one or more types of memory (e.g., RAM, SRAM, DRAM, EEPROM, Flash, etc.). Disk 128 may include a hard disk drive and/or a solid-state drive. Memory 127 and disk 128 may comprise hardware storage devices.

The computing device 154 may comprise a mobile computing device, such as a tablet computer, that allows a user to access a graphical user interface for the data security system 120. A user interface may be provided by the data security system 120 and displayed using a display screen of the computing device 154.

A server, such as server 160, may allow a client device, such as the data security system 120 or computing device 154, to download information or files (e.g., executable, text, application, audio, image, or video files) from the server. The server 160 may comprise a hardware server. In some cases, the server may act as an application server or a file server. In general, a server may refer to a hardware device that acts as the host in a client-server relationship or to a software process that shares a resource with or performs work for one or more clients. The server 160 includes a network interface 165, processor 166, memory 167, and disk 168 all in communication with each other. Network interface 165 allows server 160 to connect to one or more networks 180. Network interface 165 may include a wireless network interface and/or a wired network interface. Processor 166 allows server 160 to execute computer readable instructions stored in memory 167 in order to perform processes described herein. Processor 166 may include one or more processing units, such as one or more CPUs, one or more GPUs, and/or one or more NPUs. Memory 167 may comprise one or more types of memory (e.g., RAM, SRAM, DRAM, EEPROM, Flash, etc.). Disk 168 may include a hard disk drive and/or a solid-state drive. In some cases, the disk 168 may include a flash-based SSD or a hybrid HDD/SSD drive. Memory 167 and disk 168 may comprise hardware storage devices.

The networked computing environment 100 may provide a cloud computing environment for one or more computing devices. In one embodiment, the networked computing environment 100 may include a virtualized infrastructure that provides software, data processing, and/or data storage services to end users accessing the services via the networked computing environment. In one example, networked computing environment 100 may provide cloud-based applications to computing devices, such as computing device 154, using the data security system 120.

Figure 2B:
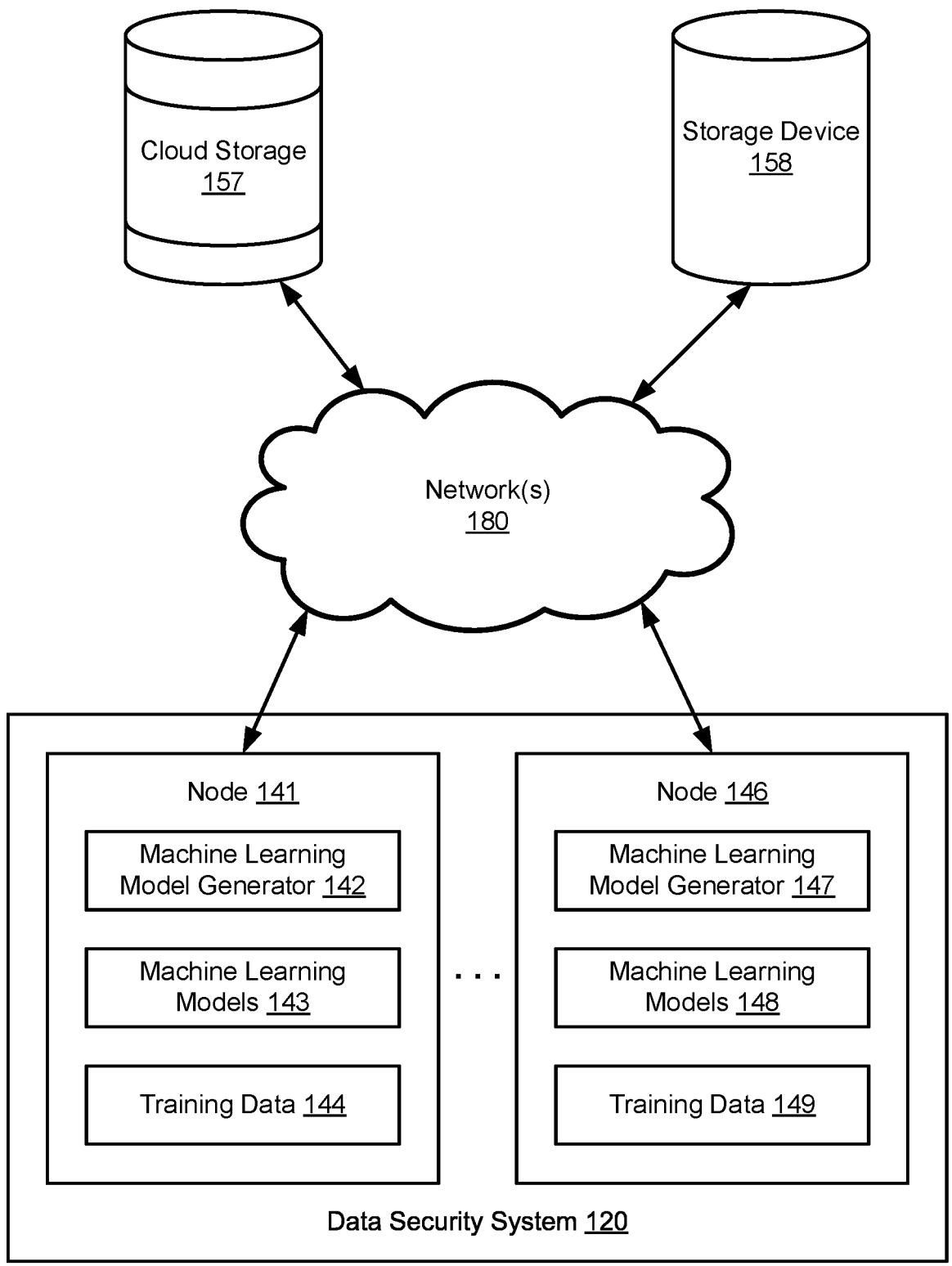
FIG. 2B depicts one embodiment of a data security system.

FIG. 2B depicts one embodiment of the data security system 120 including nodes 141 and 146 in communication with cloud data storage 157 and data storage device 158 via one or more networks 180. The nodes 141 and 146 may comprise two nodes out of multiple nodes that are networked together and present themselves as a distributed system. The cloud data storage 157 may correspond with a cloud-based storage (e.g., private or public cloud storage). Data storage device 158 may comprise a hard disk drive (HDD), a magnetic tape drive, a solid-state drive (SSD), a storage area network (SAN) storage device, or a networked-attached storage (NAS) device. As depicted, node 141 includes a machine learning model generator 142, machine learning models 143, and training data 144. Node 146 includes a machine learning model generator 147, machine learning models 148, and training data 149. The machine learning models 143 may include one or more security specific LLMs.

Figure 2C:
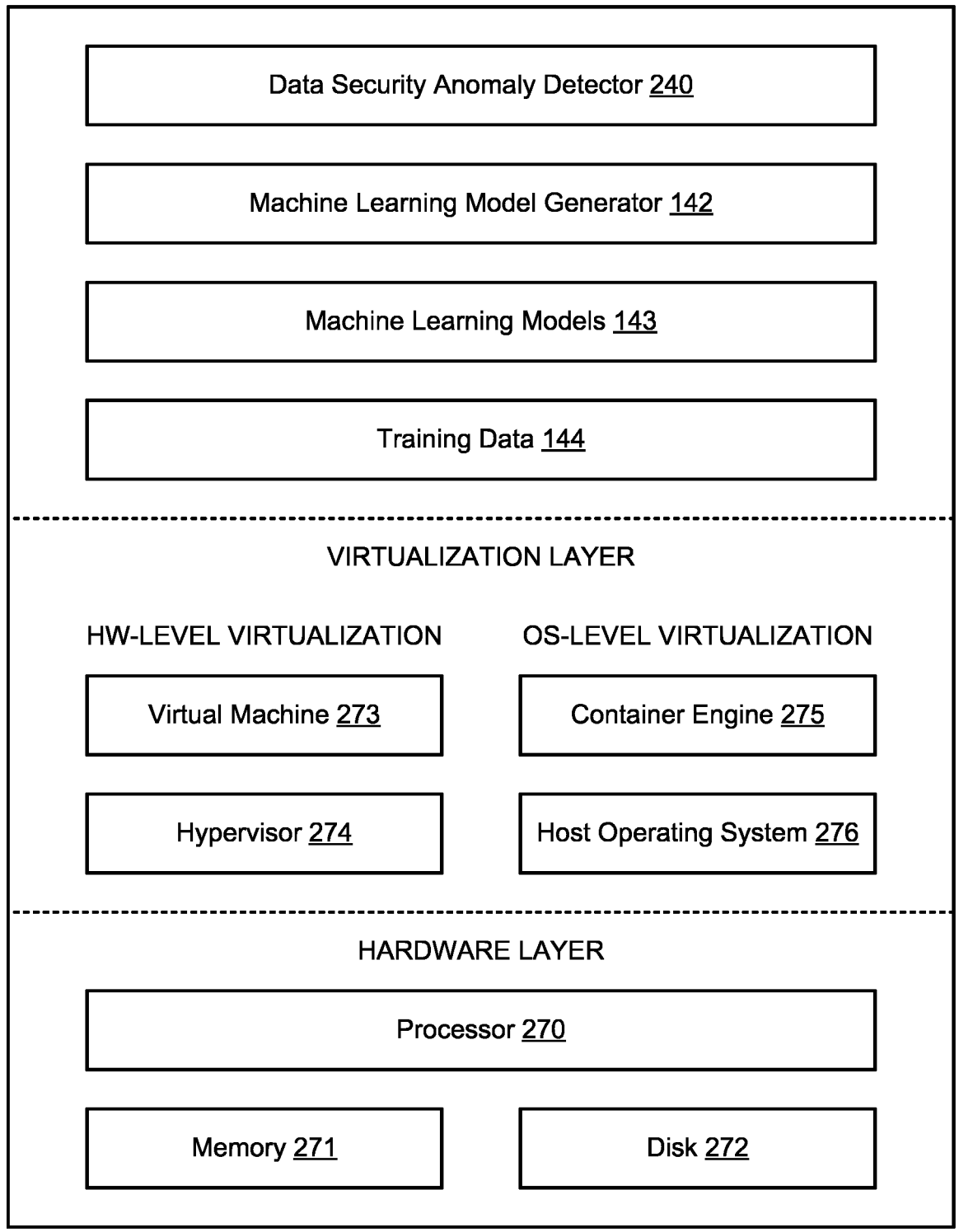
FIG. 2C depicts one embodiment of various components of a data security system.

FIG. 2C depicts one embodiment of various components of the data security system 120. As depicted, the data security system 120 includes hardware-level components and software-level components. The hardware-level components may include one or more processors 270, one or more memories 271, and one or more disks 272. Both the one or more memories 271 and the one or more disks 272 may comprise storage devices. The software-level components may include software applications and computer programs. In some embodiments, the data security anomaly detector 240, machine learning model generator 142, machine learning models 143, and training data 144 may be implemented using software or a combination of hardware and software.

In some cases, the software-level components may be run using a dedicated hardware server. In other cases, the software-level components may be run using a virtual machine or containerized environment running on a plurality of machines. In various embodiments, the software-level components may be run from the cloud (e.g., the software-level components may be deployed using a cloud-based compute and storage infrastructure).

The machine learning models 143 may comprise one or more machine learning models that are stored in a memory, such as memory 271. The one or more machine learning models may be trained, executed, and/or deployed using one or more processors, such as processor 270. The one or more machine learning models may include neural networks (e.g., deep neural networks), support vector machine models, decision tree-based models, k-nearest neighbor models, Bayesian networks, or other types of models such as linear models and/or non-linear models. A linear model may be specified as a linear combination of input features. A neural network may comprise a feed-forward neural network, recurrent neural network, or a convolutional neural network. The machine learning models 143 may include one or more multimodal models. The machine learning models 143 may include one or more language models, such as security specific LLMs.

As depicted in FIG. 2C, the software-level components may also include virtualization layer processes, such as virtual machine 273, hypervisor 274, container engine 275, and host operating system 276. The hypervisor 274 may comprise a native hypervisor (or bare-metal hypervisor) or a hosted hypervisor (or type 2 hypervisor). The hypervisor 274 may provide a virtual operating platform for running one or more virtual machines, such as virtual machine 273. A hypervisor may comprise software that creates and runs virtual machine instances. Virtual machine 273 may include a plurality of virtual hardware devices, such as a virtual processor, a virtual memory, and a virtual disk. The virtual machine 273 may include a guest operating system that has the capability to run one or more software applications. The virtual machine 273 may run the host operation system 276 upon which the container engine 275 may run.

A container engine 275 may run on top of the host operating system 276 in order to run multiple isolated instances (or containers) on the same operating system kernel of the host operating system 276. Containers may facilitate virtualization at the operating system level and may provide a virtualized environment for running applications and their dependencies. Containerized applications may comprise applications that run within an isolated runtime environment (or container). The container engine 275 may acquire a container image and convert the container image into running processes. In some cases, the container engine 275 may group containers that make up an application into logical units (or pods). A pod may contain one or more containers and all containers in a pod may run on the same node in a cluster. Each pod may serve as a deployment unit for the cluster. Each pod may run a single instance of an application.

In some embodiments, the depicted components of the data security system 120 that includes the data security anomaly detector 240, machine learning model generator 142, machine learning models 143, and training data 144 may be implemented in the cloud or in a virtualized environment that allows virtual hardware to be created and decoupled from the underlying physical hardware.

The data security system 120 may utilize the machine learning model generator 142 to generate or train a security specific LLM using the training data 144. The training data 144 may include portions of the security specific dataset 102 in FIG. 1A and portions of the security specific similar dataset 112 in FIG. 1A. The machine learning model generator 142 may include training engines such as the security specific dataset generation engine 101 in FIG. 1A, the similarity dataset generation engine 108 in FIG. 1A, the pretraining engine 106 in FIG. 1A, and the fine-tuning engine 114 in FIG. 1A.

The data security system 120 may utilize the machine learning model generator 142, machine learning models 143, and training data 144 to implement various machine learning algorithms, such as supervised machine learning algorithms. Supervised machine learning may refer to machine learning methods where labeled training data is used to train or generate a machine learning model or set of mapping functions that maps input feature vectors to output predicted answers. The trained machine learning model may then be deployed to map new input feature vectors to predicted answers. Supervised machine learning may be used to solve regression and classification problems. A regression problem is where the output predicted answer comprises a numerical value. Regression algorithms may include linear regression, polynomial regression, and logistic regression algorithms. A classification problem is where the output predicted answer comprises a label (or an identification of a particular class). Classification algorithms may include support vector machine, decision tree, k-nearest neighbor, and random forest algorithms.

In some cases, a support vector machine algorithm may determine a hyperplane (or decision boundary) that maximizes the distance between data points for two different classes. The hyperplane may separate the data points for the two different classes and a margin between the hyperplane and a set of nearest data points (or support vectors) may be determined to maximize the distance between the data points for the two different classes.

In some cases, a k-nearest neighbor algorithm may determine a set of test data points and a set of training data points, identify a distance function, calculate distances between a selected data point of the set of test data points to each of the set of training data points using the distance function, and then sort the calculated distances to identify a subset of the set of training data points that are closest to the selected data point (e.g., the k-nearest neighbors to the selected data point). The distance function may calculate a Euclidean distance, a Manhattan distance, or a Hamming distance. In at least one example, the k-nearest neighbor algorithm may comprise an approximate k-nearest neighbor algorithm that utilizes navigable small world graphs with controllable hierarchy.

During a training phase, a machine learning model, such as one of the machine learning models 143, may be trained to generate predicted answers using a set of labeled training data, such as training data 144. The training data 144 may be stored in a memory, such as memory 271. In some cases, labeled data may be split into a training data set and an evaluation data set prior to or during the training phase. The machine learning model generator 142 may implement a machine learning algorithm that uses a training data set from the training data 144 to train the machine learning model and uses the evaluation data set to evaluate the predictive ability of the trained machine learning model. The predictive performance of the trained machine learning model may be determined by comparing predicted answers generated by the trained machine learning model with the target answers in the evaluation data set (or ground truth values). For a linear model, the machine learning algorithm may determine a weight for each input feature to generate a trained machine learning model that can output a predicted answer. In some cases, the machine learning algorithm may include a loss function and an optimization technique. The loss function may quantify the penalty that is incurred when a predicted answer generated by the machine learning model does not equal the appropriate target answer. The optimization technique may seek to minimize the quantified loss. One example of an appropriate optimization technique is online stochastic gradient descent.

The data security system 120 may configure one or more machine learning models of the machine learning models 143 to implement a machine learning classifier that categorizes input features into one or more classes. The one or more machine learning models may be utilized to perform binary classification (assigning an input feature vector to one of two classes) or multi-class classification (assigning an input feature vector to one of three or more classes). The output of the binary classification may comprise a prediction score that indicates the probability that an input feature vector belongs to a particular class. In some cases, a binary classifier may correspond with a function that may be used to decide whether or not an input feature vector (e.g., a vector of numbers representing the input features) should be assigned to either a first class or a second class. The binary classifier may use a classification algorithm that outputs predictions based on a linear predictor function combining a set of weights with the input feature vector. For example, the classification algorithm may compute the scalar product between the input feature vector and a vector of weights and then assign the input feature vector to the first class if the scalar product exceeds a threshold value.

The number of input features (or input variables) of a labeled data set may be referred to as its dimensionality. In some cases, dimensionality reduction may be used to reduce the number of input features that are used for training a machine learning model. The dimensionality reduction may be performed via feature selection (e.g., reducing the dimensional feature space by selecting a subset of the most relevant features from an original set of input features) and feature extraction (e.g., reducing the dimensional feature space by deriving a new feature subspace from the original set of input features). With feature extraction, new features may be different from the input features of the original set of input features and may retain most of the relevant information from a combination of the original set of input features. In at least one example, feature selection may be performed using sequential backward selection and unsupervised feature extraction may be performed using principal component analysis. In some cases, the machine learning model generator 142 may perform dimensionality reduction to reduce the number of input features from a first number of input features (e.g., 5000) to a second number of input features less than the first number of input features (e.g., 1000).

The machine learning model generator 142 may train a machine learning model using one or more training or learning algorithms. For example, the machine learning model generator 142 may utilize backwards propagation of errors (or backpropagation) to train a multi-layer neural network. In some cases, the machine learning model generator 142 may perform supervised training techniques using a set of labeled training data. In other cases, the machine learning model generator 142 may perform unsupervised training techniques using a set of unlabeled training data. The machine learning model generator 142 may perform a number of generalization techniques to improve the generalization capability of the machine learning models being trained, such as weight-decay and dropout regularization.

In some embodiments, the training data 144 may include a set of training examples. In at least one example, each training example of the set of training examples may include an input-output pair, such as a pair comprising an input vector and a target answer (or supervisory signal). In another example, each training example of the set of training examples may include an input vector and a pair of outcomes corresponding with a first decision to perform a first action and a second decision to not perform the first action. In this case, each outcome of the pair of outcomes may be scored and a positive label may be applied to the higher scoring outcome while a negative label is applied to the lower scoring outcome.

The machine learning model generator 142 may generate or train one or more language models for facilitating natural language processing. Natural language processing (NLP) may refer to the ability of a computing system to process and analyze natural language data to understand human language that is written or spoken. For example, NLP tasks may be utilized to classify portions of text (e.g., topic detection or detecting that an email is spam or that a sentence is grammatically correct) and to generate textual content (e.g., auto-completing a prompt with generated text or generating a textual summary for a large portion of text).

A large language model (LLM) may refer to a language model that comprises a neural network with a large number of parameters (e.g., millions or billions of parameters or weights). In order to reduce training time and cost, transfer learning may be utilized in which a pre-trained model is used as a starting point for a specific task and then trained or fine-tuned with a supervised dataset for the specific task. In one example, an LLM may be pre-trained using a large dataset and then fine-tuned using a much smaller dataset to tailor the LLM to solve a specific task. Pretraining may refer to the act of training a machine learning model from scratch without any prior knowledge using a large corpus of data. Fine-tuning may refer to a transfer learning process that modifies a pretrained LLM by training the LLM in a supervised or semi-supervised manner. In some cases, the fine-tuning may involve adapting a pretrained LLM for a specific task by fine-tuning the LLM using a task specific dataset.

An LLM may comprise a transformer model that is implemented using a transformer-based neural network architecture. A transformer model may include an encoder and/or a decoder. An encoder may extract features from an input sequence and a decoder may use the extracted features from the encoder to produce an output sequence. In some cases, an encoder may comprise one or more encoding layers and a decoder may comprise one or more decoding layers. Each encoding and decoding layer may include a self-attention mechanism that relates tokens within a sequence of tokens to other tokens within the sequence. In one example, the self-attention mechanism may allow the transformer model to examine a word within a sentence and determine the relative importance of other words within the same sentence to the examined word. In some cases, an encoder may include a self-attention layer and a feed forward neural network layer and a decoder may include two self-attention layers and a feed forward neural network layer. A transformer model (or transformer) may utilize an encoder-decoder architecture, an encoder only architecture, or a decoder only architecture.

One example of a transformer model is a Generative Pre-trained Transformer (GPT) model. A GPT model may comprise a type of LLM that uses deep learning to generate human-like text. A GPT model may be referred to as being "generative" because it can generate new content based on a given input prompt (e.g., a text prompt), "pre-trained" because it is trained on a large corpus of data before being fine-tuned for specific tasks, and a "transformer" because it utilizes a transformer-based neural network architecture to process the input prompt to generate the output content (or response). Generative AI may be used to generate new content, such as text, images, audio, and video content.

In some embodiments, a machine learning model may be trained to generate a language text response (or completion) given an inputted text prompt. The inputted text prompt may provide information to help guide the machine learning model to generate an appropriate text response. Prompt engineering may be used to alter or update the inputted text prompt such that the machine learning model generates a more relevant text response. In some cases, the text response may be generated by predicting the next set of words in a sequence of words provided by the inputted text prompt using a transformer model, such as a GPT language model. The transformer model may be trained using sets of input prompt-response pairs.

Multimodal learning may refer to a type of machine learning in which a machine learning model is trained to understand multiple forms of input data (e.g., text, images, video, and audio data) that derive from different modalities. Image data may include different types of images, such as color images, depth images, and thermal images. In some cases, a machine learning model may comprise a multimodal model, a language model, or a visual model.

Figure 3:
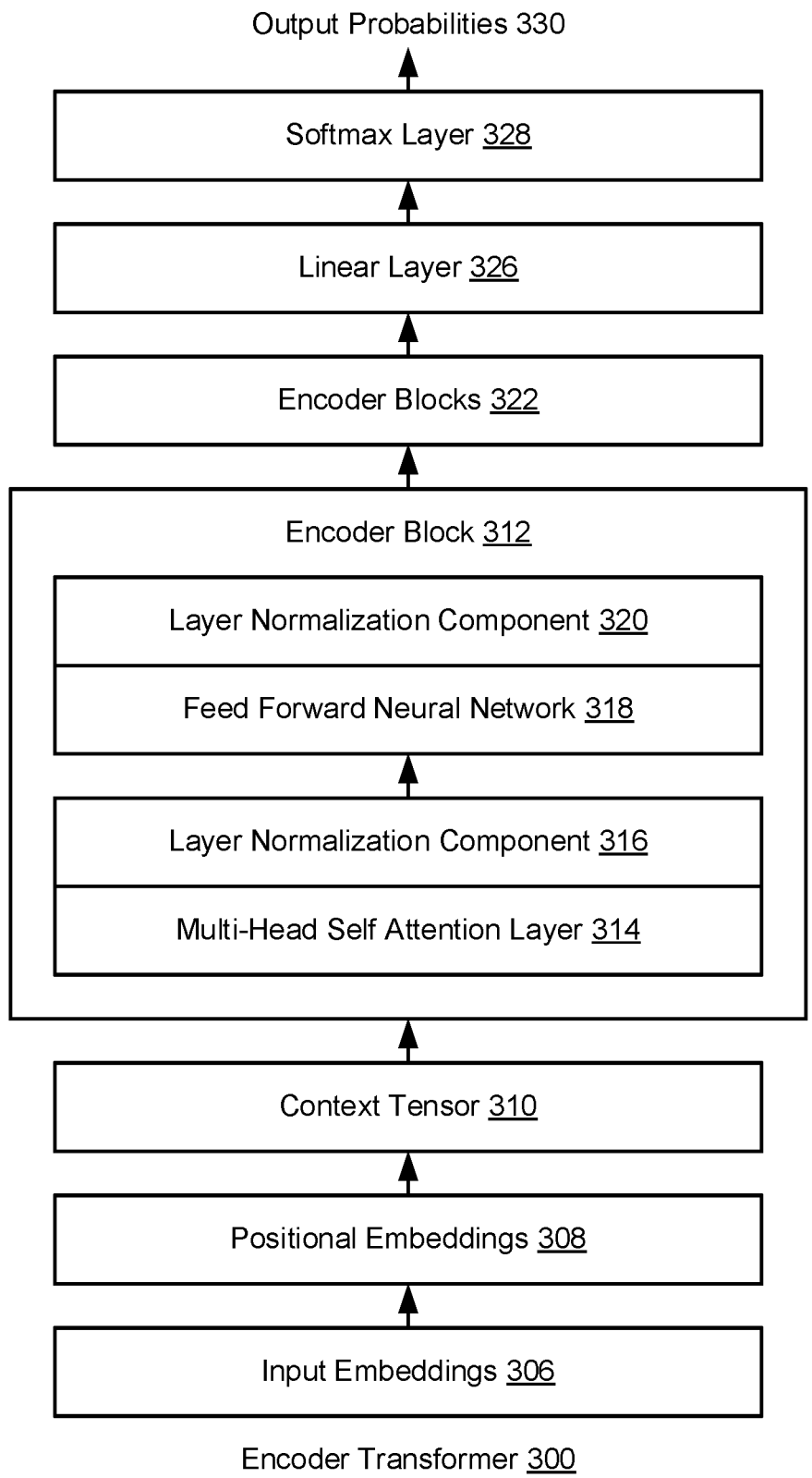
FIG. 3 depicts one embodiment of an encoder transformer.

FIG. 3 depicts one embodiment of an encoder transformer 300. The encoder transformer 300 may comprise an example of a transform model or a machine learning model, such as one of the machine learning models 143 in FIG. 2C. The encoder transformer 300 includes input embeddings 306 of an input sequence and positional embeddings 308 that represent an order of the tokens in the input sequence. A tokenizer may be used to transform the input sequence (e.g., from natural language text or from a security log) into a sequence of tokens which are encoded into the input embeddings 306. The positional embeddings 308 may add position encoding vectors to the input embeddings 306. The input embeddings 306 and the positional embeddings 308 may be combined to form a context tensor 310 that is provided to an encoder block 312. The encoder transformer 300 may include one or more encoder blocks, such as encoder block 312 and encoder blocks 322. Encoder blocks 322 may comprise one or more encoder blocks.

As depicted in FIG. 3, the encoder block 312 includes a multi-head self-attention layer 314 followed by a layer normalization component 316 and a feed-forward neural network 318 followed by a layer normalization component 320. The context tensor 310 may be input into the multi-head self-attention layer 314 of the encoder block 312 with a residual connection to layer normalization component 316. The output of the layer normalization component 316 may be input to the feed forward neural network 318 with another residual connection to layer normalization component 320. The output of each encoder block may comprise a set of hidden representations, which may be input to additional encoder blocks, such as encoder blocks 322.

An attention mechanism may be used to determine which parts of an input sequence are important or relevant for each token and should be weighted accordingly. The multi-head self-attention layer 314 may take as input the context tensor 310 and weigh the relevance of each token represented in the context tensor 310 to each other and generate corresponding attention weights for each token in the input embeddings 306.

In order to reduce training time, layer normalization components, such as layer normalization component 316, may be used between various layers of the encoder transformer 300 or after each residual connection. The linear layer 326 may comprise a fully-connected neural network that projects the scores output by the last encoder block in the encoder transformer 300. The softmax layer 328 may apply the softmax function to compute a vector that represents the probability distribution of a list of output probabilities 330. The softmax function may comprise a function that turns a vector of K real values into a vector of K real values that sum to 1.

Figure 4A:
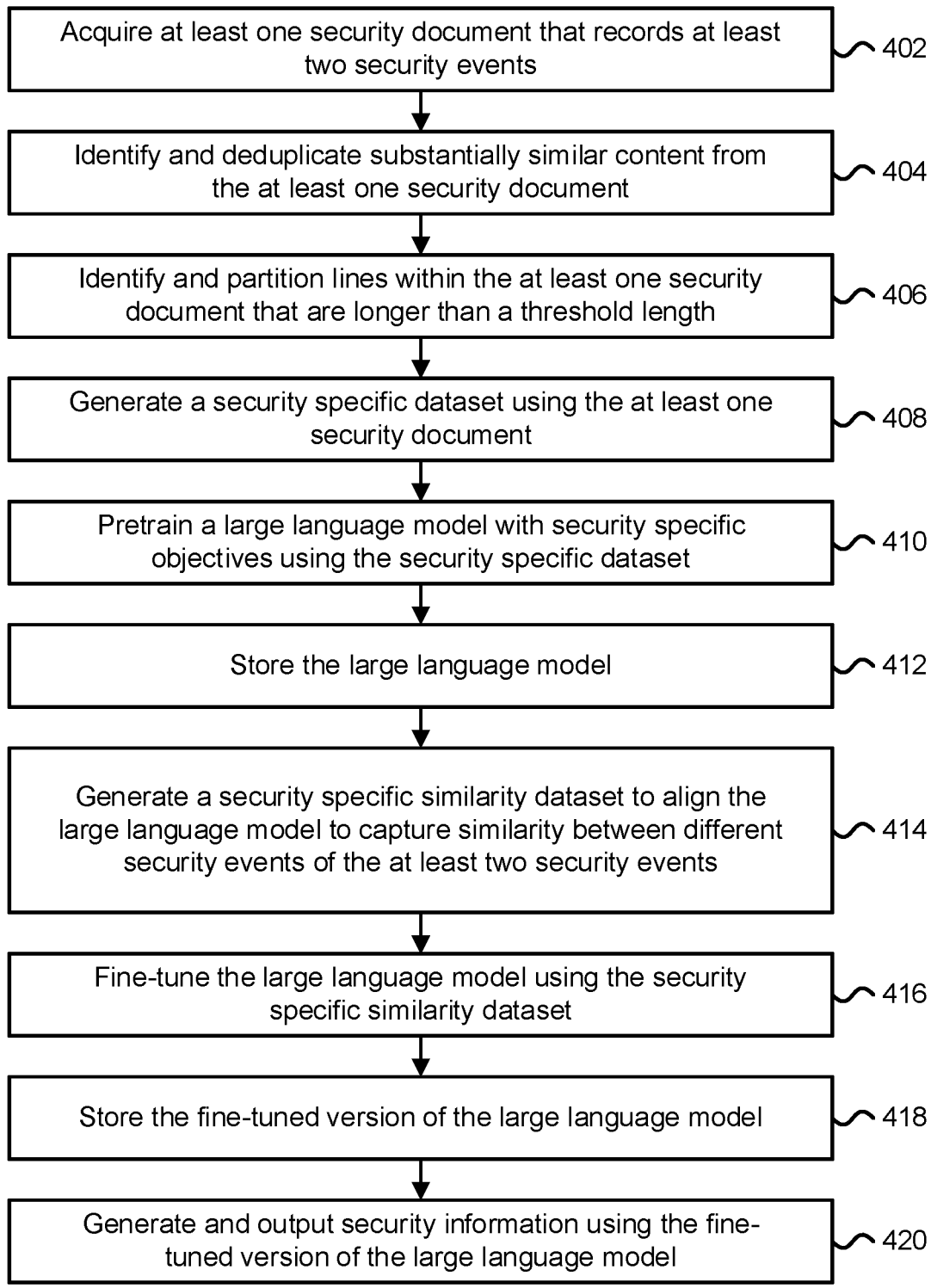
FIG. 4A depicts a flowchart describing one embodiment of a process for generating and storing a security specific large language model.

FIG. 4A depicts a flowchart describing one embodiment of a process for generating and storing a security specific large language model. In one embodiment, the process of FIG. 4A may be performed by a data security system, such as the data security system 120 in FIG. 2C. In another embodiment, the process of FIG. 4A may be implemented using a cloud-based computing platform or cloud-based computing services.

In step 402, a set of security documents that record a set of security events is acquired. The set of security documents may comprise at least one security document and the set of security events may comprise at least two security events. The set of security documents may include one or more security logs, alerts, and other electronic documents storing threat intelligence and security related information. The set of security documents may include a security log that records various security events, file deletions, successful and unsuccessful login attempts, and authentication successes and failures. Each security event recorded in the security log or stored in the security log may correspond with a log line in the security log. In step 404, substantially similar content is identified and deduplicated (or removed) from the set of security documents. In some cases, two or more log lines within the set of security documents that are exact matches with each other or that have at least a degree of similarity (e.g., have a cosine similarity score above 0.7) may be consolidated or removed from the set of security documents.

In step 406, lines within the set of security documents that are longer than a threshold length are identified and partitioned into two or more lines that are less than the threshold length. The threshold length may correspond with a threshold number tokens or a threshold number of character strings. In one example, each line (e.g., each log line) within the set of security documents that comprise more than 1024 tokens maybe be partitioned into a plurality of lines, in which each line of the plurality of lines comprises less than 1024 tokens. In step 408, a security specific dataset is generated using the set of security documents. In one example, the security specific dataset generation engine 101 in FIG. 1A may be used to generate the security specific dataset.

In step 410, a large language model is pretrained (or trained) with security specific objectives using the security specific dataset. The security specific objectives may include next log line prediction given log lines associated with a host, system, application, users, and/or a history of cyber attack behavior. In step 412, the large language model is stored. The large language model may be stored in a memory, data store, or in persistence layer. In step 414, a security specific similarity dataset is generated. The security specific similarity dataset may be generated using a similarity dataset generation engine, such as the similarity dataset generation engine 108 in FIG. 1A. The security specific similarity dataset may be used to align the large language model to capture similarity between different security events of the set of security events. In step 416, the large language model is fine-tuned using the security specific similarity dataset. In step 418, the fine-tuned version of the large language model is stored.

In some embodiments, the security specific similarity dataset may include positive log line pairs and negative log line pairs which may be used to fine-tune or train the fine-tuned version of the large language model such that positive pairings of similar cyber security events (e.g., failed logins and password changes) map to embeddings that are close to each other within some distance measure (e.g., within a threshold cosine similarity or Euclidian distance) and negative pairings map to embeddings that are far apart by more than the distance measure.

In step 420, a set of security information is generated and outputted using the fine-tuned version of the large language model. In one example, the fine-tuned version of the large language model may be deployed to provide indexing and searching of security related content that is stored within a security document. The fine-tuned version of the large language model may be used to generate embedding representations for each document within a knowledge base of security documents. The fine-tuned version of the large language model may also be used to generate an embedding representation for a submitted search query, which may be compared with the embedding representations generated for each document within the knowledge base of security documents. Relevant documents may be ranked and outputted (e.g., displayed using a computing device that submitted the search query).

In some cases, fine-tuning of the large language model may be used to assign similar embeddings to similar security events and assign different embeddings to non-similar security events. During fine-tuning, two identical pretrained large language models may be fine-tuned at the same time with a loss function optimized to reward correctly predicting positive and negative pairs.

Figure 4B:
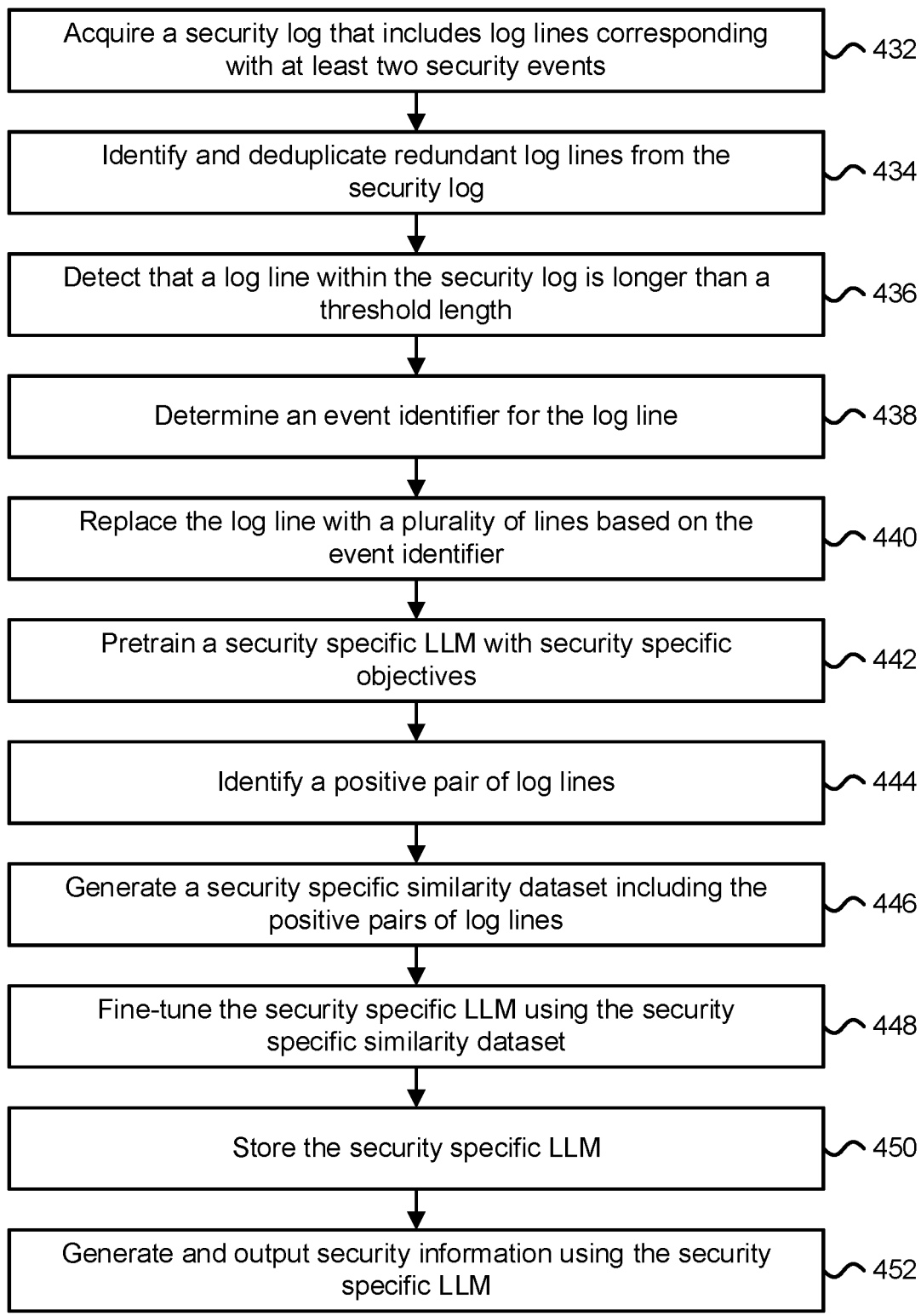
FIG. 4B depicts a flowchart describing an alternative embodiment of a process for generating and storing a security specific large language model.

FIG. 4B depicts a flowchart describing an alternative embodiment of a process for generating and storing a security specific large language model. In one embodiment, the process of FIG. 4B may be performed by a data security system, such as the data security system 120 in FIG. 2C. In another embodiment, the process of FIG. 4B may be implemented using a cloud-based computing platform or cloud-based computing services.

In step 432, a security log is acquired. The security log may comprise a plurality of log lines. The security log may comprise a document within a set of security documents. The security log may include log lines corresponding with a set of security events. The set of security events may comprise at least two security events. In step 434, redundant log lines are identified and deduplicated (or removed) from the security log. In some cases, substantially similar log lines or log lines that have at least a degree of similarity (e.g., have a cosine similarity score above 0.7) may be removed from the security log such that only one of the log lines remains. In step 436, it is detected that a log line within the security log is longer than a threshold length. The threshold length may comprise a threshold number tokens or a threshold number of character strings. In step 438, an event identifier for the log line is determined.

In some embodiments, an event identifier (or event ID) may be used to determine a log line pair. Event IDs may be determined for each log line in the security log. An event ID may be parsed directly from a log line if the event ID is embedded within the log line or may be assigned based on whether the log line matches a template, such as the first template 172 in FIG. 1C or the second template 174 in FIG. 1C. Each template may correspond with a unique event ID.

In step 440, the log line is replaced with a plurality of lines based on the event identifier. The event identifier may determine a window size and/or a window offset for partitioning the log line into the plurality of lines. In one example, a mapping table may be used to map event identifiers to window sizes and window offsets. In step 442, a security specific LLM is pretrained with security specific objectives.

The security specific objectives may include next log line prediction. In one embodiment, a log line or a portion thereof may be masked and the security specific LLM may be used to determine or predict the masked log line or portion thereof. The next log line or portion thereof may be predicted using a set of log lines and additional context, such as a host, system, application, and users associated with the set of log lines. In some cases, the additional context may be determined from the set of log lines themselves without requiring additional input. In another embodiment, a host, system, application, and/or username within a log line may be masked and the security specific LLM may be used to determine or predict the masked host, system, application, and/or username within the log line.

In step 444, a positive pair of log lines and a negative pair of log lines is identified. In step 446, a security specific similarity dataset including the positive pair of log lines and the negative pair of log lines is generated. In step 448, the security specific LLM is fine-tuned using the security specific similarity dataset. The positive pair of log lines and the negative pair of log lines may be used during fine-tuning of the security specific LLM to generate an embedding space in which positive pairs of log lines are given similar embeddings that minimize their embedding distances while negative pairs of log lines are given different embeddings that maximize their embedding distances.

In some embodiments, the security specific LLM may be fine-tuned using the security specific similarity data set such that the positive pair of log lines are given similar embeddings with a first embedding distance while the negative pair of log lines are given different embeddings with a second embedding distance greater than the first embedding distance. The embedding distance may correspond with a Euclidean distance, a cosine similarity distance, or a distance metric for measuring the proximity between two vectors in a vector space.

In step 450, the security specific LLM is stored within a data store or transferred to data storage. In step 452, a set of security information is generated using the security specific LLM. The set of security information may be outputted (e.g., transferred or displayed). In some cases, the security specific LLM may be deployed to generate security related information for various security related scenarios such as search and retrieval of log lines associated with security events, clustering of similar security events into buckets, and prompt generation for generative AI models for summarizing security events.

At least one embodiment of the disclosed technology includes a storage device configured to store a large language model and one or more processors in communication with the storage device. The one or more processors are configured to generate a security specific dataset using a set of security documents that records a set of security events, train the large language model with security specific objectives using the security specific dataset, generate a security specific similarity dataset that captures similarity between different security events of the set of security events, fine-tune the large language model using the security specific similarity dataset, and store the large language model using the storage device.

In some cases, the one or more processors may be configured to identify an event identifier for a log line within the set of security documents and partition the log line based on the event identifier during generation of the security specific dataset.

In some cases, the one or more processors may be configured to identify and partition log lines within the set of security documents that are longer than a threshold length (e.g., a threshold token length) during generation of the security specific dataset.

In some cases, the one or more processors may be configured to identify an event identifier for a log line within the set of security documents, determine a window size based on the event identifier, and partition the log line such that a new log line is generated within the set of security documents with a line length equal to the window size.

In some cases, the one or more processors may be configured to remove a first log line from the set of security documents based on a cosine similarity between the first log line and a second log line from the set of security documents during generation of the security specific dataset.

In some cases, the security specific objectives may include prediction of a next log line given an input sequence of log lines associated with a particular user failing to access a computer system or a computing device.

In some cases, the one or more processors may be configured to identify a set of positive log line pairs based on event identifiers for log lines within the set of security documents and fine-tune the large language model using the set of positive log line pairs.

At least one embodiment of the disclosed technology includes a storage device configured to store a large language model and one or more processors in communication with the storage device. The one or more processors are configured to generate a security specific dataset, the security specific dataset is generated using at least one security document that records at least two security events. The one or more processors are configured to train the large language model with security specific objectives, the large language model is trained using the security specific dataset. The one or more processors are configured to generate a security specific similarity dataset that captures similarity between different security events of the at least two security events. The one or more processors are configured to fine-tune the large language model, the large language model is fine-tuned using the security specific similarity dataset. The one or more processors are configured to store the large language model, the large language model is stored using the storage device.

At least one embodiment of the disclosed technology includes generating a security specific dataset, the security specific dataset is generated using at least one security document that records at least two security events; pretraining the security specific large language model with security specific objectives, the security specific large language model is pretrained using the security specific dataset; generating a security specific similarity dataset that captures similarity between different security events of the at least two security events; fine-tuning the security specific large language model, the security specific large language model is fine-tuned using the security specific similarity dataset; and storing the security specific large language model, the security specific large language model is stored using a storage device.

At least one embodiment of the disclosed technology includes generating a security specific dataset using a set of security documents that records a set of security events, pretraining the security specific large language model with security specific objectives using the security specific dataset, generating a security specific similarity dataset that captures similarity between different security events of the set of security events, fine-tuning the security specific large language model using the security specific similarity dataset, and storing the security specific large language model using a storage device.

In some cases, the generating the security specific dataset may include identifying an event identifier for a log line within the set of security documents and partitioning the log line based on the event identifier. The generating the security specific dataset may include partitioning log lines within the set of security documents that are longer than a maximum number of tokens.

At least one embodiment of the disclosed technology includes a storage device configured to store a security specific large language model and one or more processors in communication with the storage device. The one or more processors are configured to acquire a security log that includes log lines corresponding with a set of security events, pretrain the security specific large language model with security specific objectives, identify a positive pair of log lines and a negative pair of log lines from the security log, generate a security specific similarity data set including the positive pair of log lines and the negative pair of log lines, fine-tune the security specific large language model using the security specific similarity data set such that the positive pair of log lines are given similar embeddings with a first embedding distance while the negative pair of log lines are given different embeddings with a second embedding distance greater than the first embedding distance, and store the security specific large language model using the storage device.

The disclosed technology may be described in the context of computer-executable instructions being executed by a computer or processor. The computer-executable instructions may correspond with portions of computer program code, routines, programs, objects, software components, data structures, or other types of computer-related structures that may be used to perform processes using a computer. Computer program code used for implementing various operations or aspects of the disclosed technology may be developed using one or more programming languages, including an object oriented programming language such as Java or C++, a function programming language such as Lisp, a procedural programming language such as the "C" programming language or Visual Basic, or a dynamic programming language such as Python or JavaScript. In some cases, computer program code or machine-level instructions derived from the computer program code may execute entirely on an end user's computer, partly on an end user's computer, partly on an end user's computer and partly on a remote computer, or entirely on a remote computer or server.

The flowcharts and block diagrams in the figures provide illustrations of the architecture, functionality, and operation of possible implementations of systems, methods, and computer program products according to various aspects of the disclosed technology. In this regard, each step in a flowchart may correspond with a program module or portion of computer program code, which may comprise one or more computer-executable instructions for implementing the specified functionality. In some implementations, the functionality noted within a step may occur out of the order noted in the figures. For example, two steps shown in succession may, in fact, be executed substantially concurrently, or the steps may sometimes be executed in the reverse order, depending upon the functionality involved. In some implementations, steps may be omitted and other steps added without departing from the spirit and scope of the present subject matter. In some implementations, the functionality noted within a step may be implemented using hardware, software, or a combination of hardware and software. As examples, the hardware may include microcontrollers, microprocessors, field programmable gate arrays (FPGAs), and electronic circuitry.

For purposes of this document, the term "processor" may refer to a real hardware processor or a virtual processor, unless expressly stated otherwise. A virtual machine may include one or more virtual hardware devices, such as a virtual processor and a virtual memory in communication with the virtual processor.

For purposes of this document, it should be noted that the dimensions of the various features depicted in the figures may not necessarily be drawn to scale.

For purposes of this document, reference in the specification to "an embodiment," "one embodiment," "some embodiments," "another embodiment," and other variations thereof may be used to describe various features, functions, or structures that are included in at least one or more embodiments and do not necessarily refer to the same embodiment unless the context clearly dictates otherwise.

For purposes of this document, a connection may be a direct connection or an indirect connection (e.g., via another part). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify or distinguish separate objects.

For purposes of this document, the term "set" of objects may refer to a "set" of one or more of the objects.

For purposes of this document, the phrases "a first object corresponds with a second object" and "a first object corresponds to a second object" may refer to the first object and the second object being equivalent, analogous, or related in character or function.

For purposes of this document, the term "or" should be interpreted in the conjunctive and the disjunctive. A list of items linked with the conjunction "or" should not be read as requiring mutual exclusivity among the items, but rather should be read as "and/or" unless expressly stated otherwise. The terms "at least one," "one or more," and "and/or," as used herein, are open-ended expressions that are both conjunctive and disjunctive in operation. The phrase "A and/or B" covers embodiments having element A alone, element B alone, or elements A and B taken together. The phrase "at least one of A, B, and C" covers embodiments having element A alone, element B alone, element C alone, elements A and B together, elements A and C together, elements B and C together, or elements A, B, and C together. The indefinite articles "a" and "an," as used herein, should typically be interpreted to mean "at least one" or "one or more," unless expressly stated otherwise.

The various embodiments described above can be combined to provide further embodiments. All of the U.S. patents, U.S. patent application publications, and U.S. patent applications referred to in this specification and/or listed in the Application Data Sheet are incorporated herein by reference, in their entirety. Aspects of the embodiments can be modified, if necessary to employ concepts of the various patents, applications, and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system for generating a security specific large language model, comprising:
   a storage device configured to store a large language model; and
   one or more processors in communication with the storage device that are configured to:
      generate a security specific dataset, the security specific dataset is generated using at least one security document that records at least two security events;
      train the large language model with security specific objectives, the large language model is trained using the security specific dataset;
      generate a security specific similarity dataset that captures similarity between different security events of the at least two security events;
      fine-tune the large language model, the large language model is fine-tuned using the security specific similarity dataset; and
      store the large language model, the large language model is stored using the storage device.

2. The system of claim 1, wherein:
   the one or more processors are configured to identify an event identifier for a log line within the at least one security document and partition the log line based on the event identifier during generation of the security specific dataset.

3. The system of claim 1, wherein:
the one or more processors are configured to identify and partition log lines within the at least one security document that are longer than a threshold length during generation of the security specific dataset.

4. The system of claim 3, wherein:
the threshold length comprises a maximum number of tokens.

5. The system of claim 1, wherein:
the one or more processors are configured to identify an event identifier for a log line within the at least one security document, determine a window size based on the event identifier, and partition the log line such that a new log line is generated within the at least one security document with a line length equal to the window size.

6. The system of claim 1, wherein:
the one or more processors are configured to remove a first log line from the at least one security document based on a cosine similarity between the first log line and a second log line from the at least one security document during generation of the security specific dataset.

7. The system of claim 1, wherein:
the security specific objectives include prediction of a next log line given a set of log lines that record a history of cyber attack behavior.

8. The system of claim 1, wherein:
the at least two security events includes a failed login attempt; and
the security specific objectives include prediction of a next log line given an input sequence of log lines associated with a particular user failing to access a computing device.

9. The system of claim 1, wherein:
the one or more processors are configured to identify a set of positive log line pairs based on event identifiers for log lines within the at least one security document and fine-tune the large language model, the large language model is fine-tuned using the set of positive log line pairs.

10. The system of claim 1, wherein:
the one or more processors are configured to generate, using the large language model, a set of security information and output at least a subset of the set of security information.

11. The system of claim 1, wherein:
the one or more processors are configured to acquire a search query, convert the search query into an embedding using the large language model, identify a set of relevant documents of the set of security documents using the embedding.

12. A method for generating a security specific large language model, comprising:
generating a security specific dataset, the security specific dataset is generated using at least one security document that records at least two security events;
pretraining the security specific large language model with security specific objectives, the security specific large language model is pretrained using the security specific dataset;
generating a security specific similarity dataset that captures similarity between different security events of the at least two security events;
fine-tuning the security specific large language model, the security specific large language model is fine-tuned using the security specific similarity dataset; and
storing the security specific large language model, the security specific large language model is stored using a storage device.

13. The method of claim 12, wherein:
the generating the security specific dataset includes identifying an event identifier for a log line within the at least one security document and partitioning the log line based on the event identifier.

14. The method of claim 12, wherein:
the generating the security specific dataset includes partitioning log lines within the at least one security document that are longer than a maximum number of tokens.

15. The method of claim 12, wherein:
the generating the security specific dataset includes identifying an event identifier for a log line within the at least one security document, determining a window size based on the event identifier, and partitioning the log line such that a new log line is generated within the at least one security document with a length equal to the window size.

16. The method of claim 12, wherein:
the pretraining the security specific large language model includes training the security specific large language model to predict a next log line given an input sequence of log lines associated with a particular user failing to access a computing device.

17. The method of claim 12, further comprising:
acquiring a search query;
generating, using the security specific large language model, an embedding for the search query; and
identifying, using the embedding, at least one relevant document of the at least one security document.

18. A system for generating a security specific large language model, comprising:
a storage device configured to store the security specific large language model; and
one or more processors in communication with the storage device that are configured to:
acquire a security log that includes log lines corresponding with at least two security events;
pretrain the security specific large language model with security specific objectives;
identify a positive pair of log lines and a negative pair of log lines from the security log;
generate a security specific similarity data set including the positive pair of log lines and the negative pair of log lines;
fine-tune the security specific large language model, the security specific large language model is fine-tuned using the security specific similarity data set such that the positive pair of log lines are given similar embeddings with a first embedding distance while the negative pair of log lines are given different embeddings with a second embedding distance greater than the first embedding distance; and
store the security specific large language model, the security specific large language model is stored using the storage device.

19. The system of claim 18, wherein:
the one or more processors are configured to identify an event identifier for a log line within the security log and partition the log line based on the event identifier during generation of the security specific dataset.

20. The system of claim 18, wherein:
the one or more processors are configured to identify an event identifier for a log line within the security log, determine a window size based on the event identifier, and partition the log line such that a new log line is generated within the security log with a line length equal to the window size.

\* \* \* \* \*